United States Patent [19]
Bauer et al.

[11] 3,877,106  
[45] Apr. 15, 1975

[54] WINDSHIELD WIPER BLADE ASSEMBLY AND WIPER BLADE CONSTRUCTION

[75] Inventors: Kurt Bauer, Kleiningersheim; Wilhelm Dorr; Alfred Kohler, both of Bietigheim; Martin Weber, Grossingersheim; Eckhardt Schmid, Guglingen, all of Germany

[73] Assignee: SWF-Speczialfabrik fur Autozubehor Gustav Rau GmbH, Bietigheim, Germany

[22] Filed: Nov. 28, 1973

[21] Appl. No.: 419,672

[30] Foreign Application Priority Data
Jan. 17, 1973 Germany.............................. 2302154

[52] U.S. Cl. .............................................. 15/250.42
[51] Int. Cl. ........................... B60s 1/02; B60s 1/38
[58] Field of Search ....... 15/250.42, 250.32, 250.31, 15/250.35

[56] References Cited
UNITED STATES PATENTS
3,179,969   4/1965   Glynn .............................. 15/250.32

FOREIGN PATENTS OR APPLICATIONS
1,090,122   9/1960   Germany ........................ 15/250.42
1,505,554   7/1960   Germany ........................ 15/250.42

*Primary Examiner*—Peter Feldman
*Attorney, Agent, or Firm*—McGlew and Tuttle

[57] ABSTRACT

A windshield wiper blade assembly comprises a yoke member which has a projecting spherical blade engagement member which presents an enlarged intermediate portion or ball member which is adapted to engage into a ball-shaped recess by entry through a top surface slot on an intermediate yoke member. The intermediate yoke member is formed with a slot extending downwardly from the intermediate enlarged portion of the receiving recess to the bottom of the member to permit flexure of both ends of the member to close the slot at the bottom and to open the slot at the top to permit access of the blade engagement member of the yoke. The intermediate member is made of triangular cross-section and the slot for receiving the blade engagement member of the yoke member is of vertical triangular configuration with the apex of the triangle located adjacent the slot at the bottom of the intermediate yoke member. The triangular configuration extends on each side of the spherical receiving recess for the ball member of the yoke.

6 Claims, 3 Drawing Figures

WINDSHIELD WIPER BLADE ASSEMBLY AND WIPER BLADE CONSTRUCTION

BACKGROUND OF THE INVENTION

1. Field of the Invention

This invention relates in general to the construction of wiper blades and, in particular, to a new and useful wiper blade assembly and intermediate yoke member construction, particularly for automotive vehicles, in which the intermediate yoke member includes a receiving recess for a ball member carried on a yoke which carries the blade during its operation.

2. Description of the Prior Art

Many types of wiper blade assemblies are known, and the usual construction provides for a mounting of the blade on a yoke member such that the connecting joints permit pivotal movement between the blade and the yoke member only at right angles to the wiping area of the windshield. This known construction requires a minimal axial length of the connecting elements, and intermediate constructural members which make the assembly expensive. If such an assembly is made with a yoke of a soft plastic material, for example, then the joint connection is not strong enough to resist the tilting forces without developing a backlash at right angles to the wiper blade. If, however, a rigid plastic material is used to produce the yoke, then manufacturing difficulties are experienced.

SUMMARY OF THE INVENTION

In accordance with the present invention, there is provided a wiper blade which includes a blade member or intermediate yoke having a receiving recess for the snap-fit engagement of a blade engagement member of a carrying yoke. The construction is such that a relatively non-resilient plastic material may be used for the yoke to provide a blade joint which is without backlash and which does not require the expensive materials and process steps in its manufacture. The wiper blade assembly includes a yoke member which has a projecting blade engagement member thereon with an enlarged intermediate portion and which may, for example, be in the form of a ball member which engages into a complementarily shaped recess of the wiper blade. The construction of the intermediate yoke member is featured by the provision of a top slot which is made smaller than the maximum diameter of the engagement portion carried by the yoke and which also includes a bottom slot which permits the blade to be resiliently bent from each side to open the top yoke to permit entry of the blade engagement member. The construction of the bottom slot and the side apertures of the slot ensure that the moisture which may tend to accumulate therein is easily drained. The construction also ensures that the wiper blade is sufficiently resilient in the area of the slot to easily accommodate the working projection member or ball of the yoke and to engage with the ball member during operation without difficulty. The intermediate yoke member is advantageously made of a triangular configuration and the receiving recess is formed in a central portion of a generally triangularly shaped slot of the blade which has a triangular configuration in a vertical plane with an apex oriented generally in the vicinity of the bottom slot of the blade engagement member receiving recess. The triangular portion is cut away from each side of the intermediate portion which forms the rounded receiving recess for the ball member of the yoke.

For the wiper blade holder to have good dynamic properties, it is advantageous that the intermediate yoke member have a triangular cross-section and that the receiving recess be located in a triangular indentation of the blade which has a base which faces the receiving yoke for the blade. The yoke itself may also have a triangular cross-section and the hypotenuse of this cross-section faces the wiper blade receiving recess.

Accordingly, it is an object of the invention to provide a windshield wiper blade assembly which comprises a yoke member having a projecting blade engagement member thereon with an enlarged intermediate portion which is engageable into a receiving recess of a wiper blade intermediate yoke member of complementary configuration and wherein the member includes an access slot at its top surface to the receiving recess through which the blade engagement member moves into engagement in the receiving recess and also includes a slot extending upwardly from the bottom of the member to the receiving recess to permit the blade to be flexed for the purpose of receiving the blade engagement member of the supporting yoke.

A further object of the invention is to provide a wiper blade or yoke member which includes a receiving recess having an access slot extending up to the top of the blade and a bottom slot extending from the access to the bottom of the blade to permit flexure of the blade, the receiving recess being opened at the top by flexure of the blade for receiving a blade engagement member.

A further object of the invention is to provide a wiper blade assembly and wiper blade construction which are simple in design, rugged in construction, and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
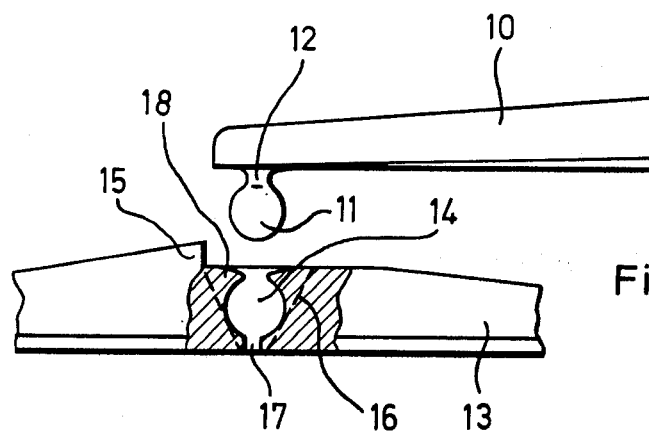
FIG. 1 is a partial side elevational and partial sectional view of a wiper blade assembly constructed in accordance with the invention.
Figure 2:
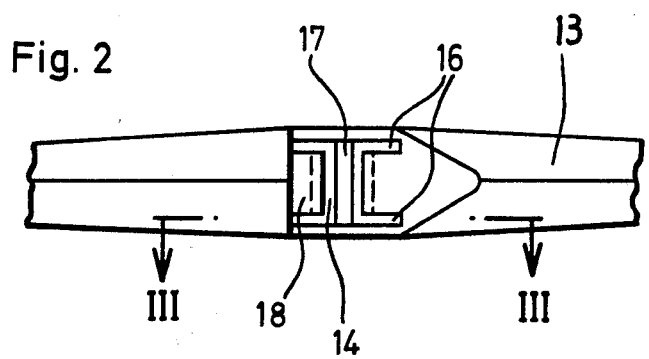
FIG. 2 is a top plan view of the wiper blade shown in FIG. 1.

Referring to the drawings in particular, the invention embodied therein, comprises a wiper blade assembly which includes a main yoke or supporting member 10 for carrying a wiper blade either directly or through an intermediate yoke 13. In the embodiment illustrated, the intermediate yoke 13 is adapted to engage at its respective outer ends, which are not shown, with a wiper blade, but of course, it is conceivable that the yoke 13 can be the blade itself, which is secured to a yoke 10. In the preferred form of the invention indicated in the drawings, the main yoke 10 is of triangular configuration and carries an engagement member or ball member 11 adjacent its one end which may be for engagement of a wiper blade or the yoke 13 as indicated. The engagement member 11 is connected to yoke 10 through a narrower neck portion 12 so that there is a widened intermediate portion which must be engaged through a receiving slot 17 of the receiving yoke to fit into a recess 14.

The receiving yoke or intermediate yoke 13 has a cylindrical receiving recess to receive the cylindrical engagement member 11 and it is opened at the top by the top slot access opening 17 which is of smaller dimension than the maximum dimension of engagement member 11. The cross-section of the intermediate yoke 13 is also triangular and the hypotenuse of the triangular configuration faces toward the main yoke 10. The intermediate yoke 13 is provided with a cut-out portion forming a step 15 which is adjacent the receiving recess 14 and which limits the tilting movement of the intermediate yoke 13 with respect to main yoke 10. The tilting axis of the intermediate yoke 13 coincides with the longitudinal axis of the engagement member 11.

Figure 3:
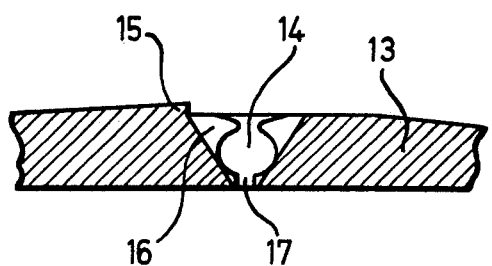
FIG. 3 is a section taken along the line III—III of FIG. 2.

In accordance with a feature of the construction, yoke member 13 is formed with an intermediate wall portion 18 which bounds recess 14 in a generally triangularly notched or recessed area 16. The recess 16 of triangular shape in a vertical plane is defined on each side of the intermediate portion 18 and the apex of the triangle is centered in respect to the bottom slot 17. Bottom slot 17, which extends upwardly from the bottom to the receiving recess 14, ensures that the yoke on each side of the slot may bend downwardly to enlarge the top access slot 17 in order to receive ball engagement member 11. The construction is such that the wall parts of the yoke 13 may be easily deflected apart without any resulting axial play of engagement member 11 in the recess 14. This is true even if the parts of the yoke 13 are made of solid material since the slot ensures that the portions of the yoke on each side thereof may be deflected apart without producing any axial play in the receiving recess 14. Slot 17 also forms outlet openings for any liquids which may penetrate into receiving recess 14. The triangular shape of the side slot 16 is shown in particular in the sectional view of FIG. 3. With such a construction, yokes 13 may be made of substantially rigid material without affecting the formation of the operative engagement of the blade engagement member 11 in receiving recess 14. The construction is very simple to manufacture and the costs thereof are relatively low. The design also improves the mounting properties of the yoke member in the region of the blade engagement member.

While a specific embodiment of the invention has been shown and described in detail to illustrate the application of the principles of the invention, it will be understood that the invention may be embodied otherwise without departing from such principles.

What is claimed is:

1. A windshield wiper blade assembly comprising a main yoke member for operatively holding a wiper blade having a projecting engagement member thereon with an enlarged intermediate portion, a second member adapted to be carried by said yoke member having a top surface with a receiving recess defined therein with an enlarged intermediate portion of a size to accommodate the enlarged portion of said engagement member, the recess including a top access slot on said top surface which is smaller than the width of the maximum dimension of said enlarged portion so as to permit forced entry of said enlarged portion of said engagement member, and a bottom slot defined in said second member extending from the bottom of said enlarged intermediate portion of said recess to the bottom of said second member and permitting flexure of said second member on each side of the bottom slot in directions toward the bottom of said second member to open the top access slot so as to receive the engagement member, said second member including an intermediate wall portion bounding each end of said receiving recess intermediate portion and a generally triangular slot on each side of the intermediate wall portion with a base of the triangular slot facing the main yoke member and the apices of said slots facing the bottom slot of said second member.

2. A windshield wiper blade assembly, according to claim 1, wherein said bottom slot is elongated in a direction transverse to said second member having an axis aligned with the axis of said engagement member.

3. A windshield wiper blade assembly, according to claim 1, wherein said engagement member comprises a ball shape member, said receiving recess being of ball shape configuration.

4. A windshield wiper blade assembly, according to claim 1, wherein the slot on each side of said intermediate wall portion is of a larger area than the receiving recess defined within said intermediate wall portion.

5. A windshield wiper blade assembly, according to claim 1, wherein said yoke member is of triangular cross-section and has a base portion which faces said second member, said second member being of triangular configuration having a hypotenuse facing toward said main yoke.

6. A windshield wiper blade assembly, according to claim 1, wherein said engagement member comprises a cylindrical member having a constricted neck portion.

* * * * *